United States Patent [19]

Oishi et al.

[11] 4,058,796
[45] Nov. 15, 1977

[54] SYSTEM FOR PROVIDING A DRIVING PERSON WITH HELPFUL INFORMATION FOR DRIVING A VEHICLE

[75] Inventors: Kazuo Oishi, Oobu; Takashi Yamada, Anjo; Shuzo Yoshida, Okazaki, all of Japan

[73] Assignee: Nippon Soken, Inc., Nishio, Japan

[21] Appl. No.: 555,304

[22] Filed: Mar. 4, 1975

[30] Foreign Application Priority Data

Mar. 5, 1974 Japan .................................. 49-26091

[51] Int. Cl.$^2$ ............................................. G08B 21/00
[52] U.S. Cl. ................................. 340/52 F; 340/279
[58] Field of Search ..................... 340/52 R, 52 F, 53, 340/279, 27 R, 27 SS, 27 AT; 200/42 R

[56] References Cited

U.S. PATENT DOCUMENTS

| 3,182,498 | 5/1965 | Koletsky et al. | 340/27 R |
|---|---|---|---|
| 3,192,503 | 6/1965 | Lang | 340/27 R |
| 3,355,706 | 11/1967 | Pitches | 340/27 R |
| 3,654,599 | 4/1972 | Sepper | 340/52 R |
| 3,794,968 | 2/1974 | Hill | 340/52 R |

Primary Examiner—Alvin H. Waring
Attorney, Agent, or Firm—Cushman, Darby & Cushman

[57] ABSTRACT

There is provided a driver assisting system in which the drivng conditions corresponding to the driving operation of a driver in a vehicle are detected to obtain a variation pattern of the driving conditions according to the variation of the driving conditions with time, and the degree of deviation of the variation pattern from the normal pattern inherent to the driver is computed, whereby information for assisting the driving operation of the driver is generated in accordance with the results of the computation.

17 Claims, 22 Drawing Figures

SYSTEM FOR PROVIDING A DRIVING PERSON WITH HELPFUL INFORMATION FOR DRIVING A VEHICLE

BACKGROUND OF THE INVENTION

1. Field of the Invention

The present invention relates to systems for assisting the drivers of vehicles, and more particularly it relates to a driver assisting system which is designed so that a driver who is driving for example an automobile is properly provided with information for assisting the driver's driving operation of the vehicle in accordance with variation of the driving conditions of the vehicle and the variation of the mental state of the driver.

2. Description of the Prior Art

Included among the systems used with the conventional automotive vehicles to supply their drivers with the required information are warning systems of the type which detect and warns of the existance of faults in the various units of the automobile, and indicating systems of the type which detect and indicate the conditions in the various parts of the automobile. However, all of these systems are disadvantageous in that only simple information corresponding to an instantaneous judgement of the separate condition is generated, and that such simple information is one-sidedly supplied to the driver and therefore there are instances where this simple information only tends to be detrimental to the driving operation of the driver.

SUMMARY OF THE INVENTION

It is an object of the present invention to provide a driver assisting system in which a variation pattern of the driving conditions of an automotive vehicle is generated in accordance with the output signal of sensing means corresponding to the driving conditions, the deviation of the variation pattern from the normal pattern corresponding to the driver is computed to generate an assistant signal, and information for assisting the driving operation of the driver is generated in accordance with the assistant signal, whereby the driving conditions taking the mental factors of the driver into consideration are determined, and the assisting information corresponding to the driving conditions is not supplied as a one-sided information to the driver, but is provided as a useful assistance to the driving operation of the driver.

The driver assisting system according to the present invention has among its great advantages the fact that since a variation pattern of the driving conditions is obtained in accordance with the output signal of sensing means for detecting the driving conditions, then the deviation of the variation pattern from the normal pattern corresponding to the driver is computed by computing means to generate an assistant signal and information for assisting the driving operation of the driver is generated by information generating means in accordance with the assistant signal, the determination of the driving conditions is effected in accordance with the deviation from the normal pattern of the variation pattern which varies depending on the mental factors of the driver, with the result that the supply of the assisting information based on the determination of the driving conditions does not result in a one-sided supply of the information to the driver as is the case with conventional systems, and thus the information supplied is very useful as an assistance for the driving operation of the driver.

Another great advantage of the system of the invention is the use of a steering sensor for detecting the operating conditions of the steering wheel as the sensing means, whereby when the variation pattern of the operating conditions of the steering wheel, which consists in the number of turns of the steering wheel made in a unit time, indicates the number of turns of the steering wheel is considerably small as compared with the normal pattern corresponding to the driver, such is considered to be an indication that the driver is in haste and impatient or he is napping and consequently the driver is advised that his current mental state is dangerous to the driving operation. Moreover it is possible to provide the necessary assisting information in accordance with various other types of deviations from the normal pattern.

Still another great advantage of the system is the use of an intake manifold pressure for detecting the variation of the intake manifold pressure as the sensing means, whereby various determinations of the mental state of the driver in relation to the movements of the acceleration pedal can be accomplished to generate the corresponding assistant information.

Still another great advantage of the system is the combined use of the steering sensor and the intake manifold pressure sensor as the sensing means, whereby various determinations of the mental state of the driver can be effected from the two sides and thus the determination of the mental state can be accomplished more properly, thereby making the resulting assistant information more useful as an assistance for the driving operation of the driver.

Still another great advantage of the system is the use of environmental condition detecting means for detecting the environmental conditions to generate output condition signals and controlling the generation of the assistant signal from the computing means in accordance with the output condition signals, whereby the assistant information corresponding to the assistant signal can be made into a more useful form that suits the surrounding conditions such as rainy weather or left turn.

DESCRIPTION OF THE PREFERRED EMBODIMENT

The present invention will now be described in greater detail with reference to the illustrated embodiment.

Figure 1:
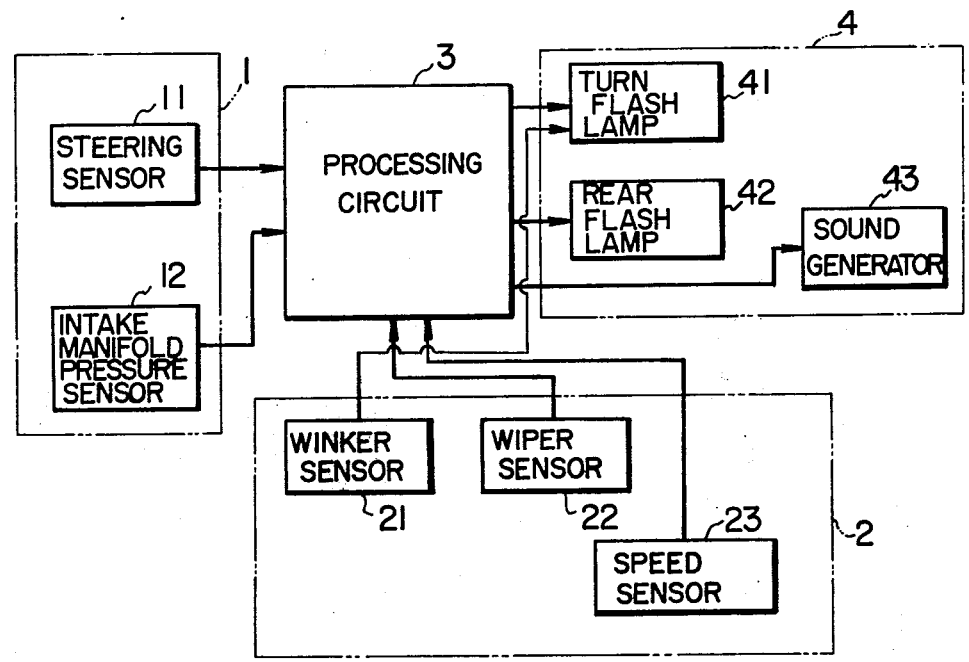
FIG. 1 is a block diagram showing the general construction of an embodiment of a driver assisting system according to the present invention.

Referring first to FIG. 1 illustrating the general construction of an embodiment of a driver assisting system according to the present invention, numeral 1 designates a first group of sensors for detecting the mental stability of the driver, which constitute sensing means for detecting the driving conditions and which may for example comprise in this embodiment a steering sensor 11 for generating a pulse each time a steering wheel (hereinafter referred to as a handle) is turned 3°, and an intake manifold pressure sensor 12 for generating a pulse each time the variation of the intake manifold pressure exceeds 50 mmHg. While, in this embodiment, only the steering sensor 11 and the intake manifold pressure sensor 12 are shown, it is possible to employ other sensors such as a sensor for detecting the acceleration and deceleration of the wheel and a sensor operatively associated with the accelerator pedal.

Numeral 2 designates a second group of sensors for detecting the environmental conditions with which the vehicle is encountering, which constitute environmental condition detecting means for detecting the surrounding environmental conditions to generate condition signals. Numeral 21 designates a winker sensor for detecting when the vehicle is about to change its direction of motion, and it is operatively associated with the winker switch to generate a condition signal based on the fact that a number of accidents (about 20% of the total) occured when the handle was turned while driving the vehicle and a large portion of the accidents (about 60% of the total accidents) occured in the vicinity of or at the intersections and that in consideration of this fact special attention is particularly needed for the driver when his vehicle is passing through a place under such conditions. Numeral 22 designates a wiper sensor for detecting the operation of the windshield wiper, which is operatively associated with the wiper switch. In other words, the statistic figures show that the number of accidents which occured in rainy weather was greater by about 40% than that of the accidents which occured under other weather conditions, and the types of accidents that showed high percentages were rear-end collisions (about 70% more), meeting collisions (about 60% more), head-on collisions and light collisions (about 70% more) and solo vehicle accidents (about 70% more). Although the number of pedestrian vehicle traffic accidents and the number of side-collisions in right turning traffic did not show high percentages, this was considered to be due to the fact that the number of pedestrians in rainy weather decreased and the traffic volume of two-wheeled vehicles decreased due to the traffic difficulty of these vehicles in rainy weather. Thus, this condition signal is generated on the ground that special attention is needed even under other similar circumstances. (These data were obtained from the statistic values of the various statistical materials). Numeral 23 designates a speed sensor for detecting the running speed, which may for example be comprised of a magnet rotatable in synchronism with the rotation of the shaft of speedometer cable and a reed switch operable in response to the rotation of the magnet. In this case, information to be produced in accordance with this speed detection may comprise information that will be provided at low running speeds of the vehicle indicating the detection of traffic congestion and thus calling for particular attention against rear-end collision or special care in passing an intersection, or information that will be provided at the relatively high running speeds of the vehicle to call for particular attention against head-on collision.

Numeral 3 designates a processing circuit constituting computing means for statistically obtaining a variation pattern of the driving conditions from the output signal of the various sensing means and computing the deviation of the variation pattern from the normal pattern to generate an assistant signal, that is, the output signals of the first sensor group 1 for detecting the mental stability of the driver and the output condition signals of the second sensor group 2 for detecting the environmental conditions with which the vehicle is encountering are processed to determine whether the vehicle is presently encountering a situation tending to give rise to an accident and a corresponding specific step that meets the situation, and an assistant signal for directing the specific step is generated.

Numeral 4 designates a display constituting information generating means responsive to the assistant signal to generate assistant information which provides a specific indication for assisting the driving operation of the driver. Numeral 41 designates turn warning lamps which may for example be lamps arranged on the sides of the front part of the vehicle for lighting, and more specifically the lamps arranged on the portions of the fender or the fender mirrors. Numeral 42 designates a rear caution lamp which may for example be mounted at a place which is easy to attract the attention of the driver, such as, a portion of the room mirror or a rear portion of the vehicle. Numeral 43 designates a sound generator for supplying the necessary assistant information to the driver by means of sound, which comprises in this embodiment a kind of device for electronically generating the scale, though it is possible to employ any other means which conveys the necessary assistant information to the driver by means of words. The display 4 comprising such a set of display devices should preferably be constructed so that the assistant information is supplied to the driver in such a manner that not only the proper warning is given to the driver, but also the assistant information is given in the form of the scale of a pleasant melody that would dissolve the emotional instability of the driver or when the vehicle is being driven with a very high degree of stability the driver is informed to that effect thus enabling the driver to see in what manner the vehicle should be driven and thereby to always drive the vehicle pleasantly and cheerfully.

Figure 2:
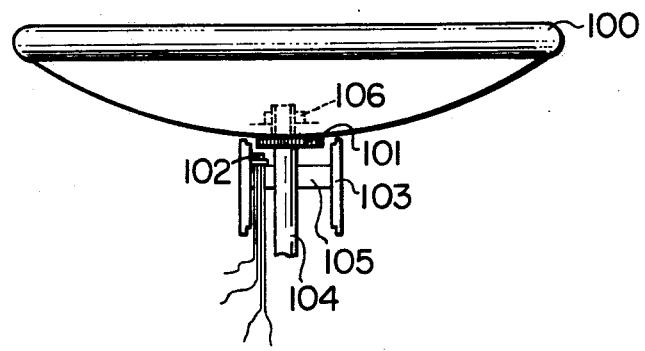
FIG. 2 is a front view of the steering sensor used in the embodiment of FIG. 1, showing the manner in which it is mounted.
Figure 3:
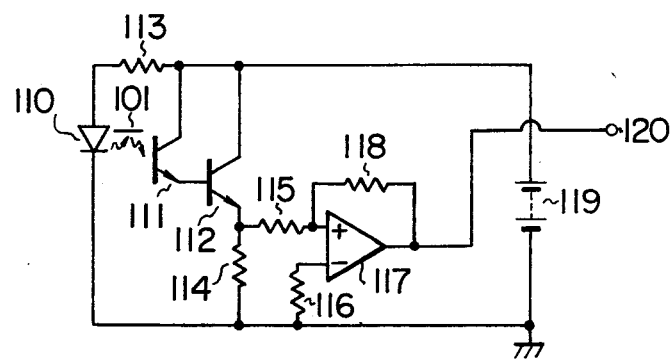
FIG. 3 is a wiring diagram of the steering sensor shown in FIG. 2.
Figure 4:
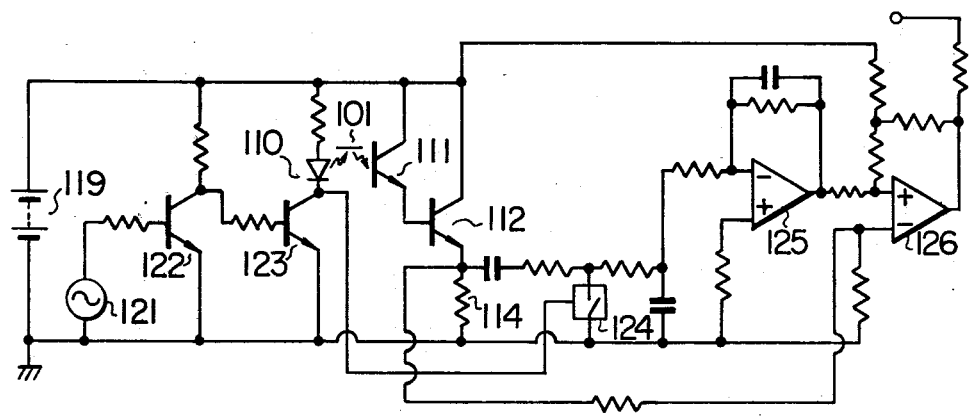
FIG. 4 is a wiring diagram of the modified steering sensor.

Next, the individual component elements of the driver assisting system will be described in greater detail. Referring first to the first sensor group 1 for detecting the mental stability of the driver, the purpose of the steering sensor 11 is to judge whether the driver is frequently turning the steering handle or he is absent-minded thus scarcely turning the handle while driving the vehicle. The detailed construction of this steering sensor 11 is shown in FIGS. 2, 3 and 4. In FIG. 2, numeral 100 designates a steering handle, 101 is a revolution detecting ring mounted on the handle 100 and including a light reflecting member having teeth at intervals of 3 degrees, 102 a photocell comprising a light emitting element and a light receiving element assembled in one unit. Numeral 103 designates a steering shaft cover, 104 a steering shaft, 105 a mount for the photocell 102. In FIG. 3 illustrating a circuit diagram of the steering sensor 11, numeral 110 designates a light emitting diode, 111 a light receiving transistor, 112 a Darlington amplifier second transistor, 113 a current limiting resistor, 114 a load resistor, 115 an input resistor, 116 a balancing resistor, 117 an operational amplifier (hereinafter simply referred to an an OP amplifier), 118 a feedback resistor, 120 an output terminal of the steering sensor 11. The photocell 102 is composed of the light emitting diode 110 and the light receiving transistor 111.

With the construction described above, the light emitted from the light emitting diode 110 is reflected by the light reflector ring 101 and it is then applied to the light receiving transistor 111. In this case, since the light reflector ring 101 is formed with the teeth cut so that when its tooth top is aligned with the photocell 102, current flows to the load resistor 114 through the light receiving transistor 111 and the Darlington second transistor 112, and a voltage is generated across the load resistor 114. The voltage is applied to the positive feedback type OP amplifier 117 so that when the voltage is developed across the load resistor 114, the output terminal 120 goes to a high level ("H" level). On the other hand, when the recess between the teeth of the light reflector ring 101 is aligned with the photocell 102, no voltage is developed across the load resistor 114 and thus the output terminal 120 goes to a low level ("L" level). In this way, each time the handle 100 is turned 3 or more degrees, an "H" level output and an "L" level output are generated at the output terminal 120.

Figure 14:

In the actual operation of the steering sensor 11 mounted on the handle 100, there are instances where not only the voltage is generated across the load resistor 114 at the tooth top of the ring 101, but also some voltage is generated across the load resistor 114 due to the leakage of the sun light or the like, and the circuit shown in FIG. 4 is designed to overcome this deficiency. In FIG. 14, numeral 121 designates a clock oscillator whose output signal is amplified by transistors 122 and 123 to control the light emitting diode 110. The light is received by the transistors 111 and 112 which in turn amplify the current and generate a voltage across the load resistor 114 in the same manner as previously mentioned. However, the output is detected by means of a synchronous detector circuit including an analog switch 124 and a filter including an OP amplifier 125, and then the detected output is compared with the DC component of the voltage developed across the load resistor 114 by a comparator including an OP amplifier 126 to produce an output signal which is not affected by any erroneous operation due to the sun light.

Figure 5:
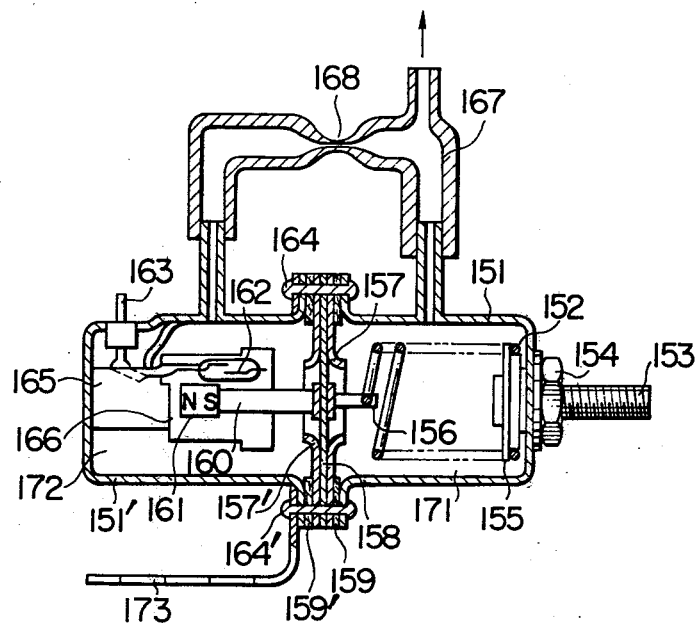
FIG. 5 is a sectional view of the intake manifold pressure sensor used in the embodiment.

Next, the detailed construction of the intake manifold pressure sensor 12 will be described with reference to FIGS. 5 and 6. In FIG. 5, numeral 151 designates the case of a first atmospheric pressure chamber 171, 152 a spring for attracting a diaphragm, 153 an adjusting screw, 154 an adjusting nut, 155 a fastener for fastening the spring 152, 156 a post for connecting a diaphragm 158 and the spring 152 together, 157 and 157' pressure plates for holding the diaphragm 158 in place and determining the pressure receiving area of the diaphragm 158, operable in response to the pressure difference, 159 and 159' hermetic sealing packings, 160 a second post connected to the diaphragm 158, 161 a permanent magnet connected to the second post 160, 162 a reed switch adapted to be opened and closed by the permanent magnet 161, 163 an output terminal, 164 and 164' locking rivets, 165 a mounting stay for the reed switch 162 and the permanent magnet 161, 166 a mount for the reed switch 162, the permanent magnet 161 and the second post 160, 167 a duct connected to an intake port of an internal combustion engine and having a restrictor 168 formed in a portion thereof, 171 a first pressure chamber, 172 a second pressure chamber, 173 a mounting stay.

Figure 6:
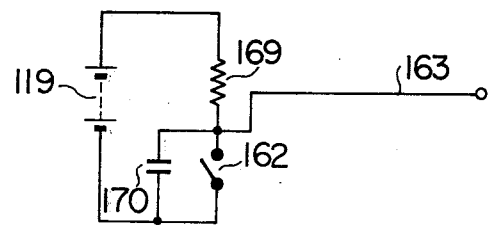
FIG. 6 is a wiring diagram for the signal output circuit of the intake manifold pressure sensor shown in FIG. 5.

Referring to FIG. 6, numeral 169 designates a signal delivering load resistor, 170 a smoothing capacitor for smoothing a signal produced by the chattering of the reed switch 162.

With the construction described above, the intake manifold pressure sensor 12 operates as follows. Firstly, in the normal operating condition of the internal combustion engine which is not shown, that is, when the engine is operating with its throttle valve being maintained at a predetermined opening, i.e., without any further opening or closing operation, the first pressure chamber 171 and the second pressure chamber 172 are interconnected by way of the resistor 168 in the duct 167 maintaining the same pressure in the two pressure chambers. Consequently, the diaphragm 158 is drawn into the first pressure chamber 171 under the force of the spring 152, so that the permanent magnet 161 is located just above the reed switch 162 and thus the reed switch 162 is closed. When the driver of the vehicle depresses the accelerator pedal so that the engine throttle valve is opened, the pressure in the intake port communicating with the atmosphere through the throttle valve opening approaches the atmospheric pressure in proportion to the opening of the throttle valve. The effect of this is applied to the duct 167 and the first pressure chamber 171 through a duct which is not shown. When this occurs, the pressure in the first pressure chamber 171 rises until it comes very close to the atmospheric pressure. On the other hand, the pressure in the second pressure chamber 172 does not rise so rapidly, since the second pressure chamber 172 is connected to the intake port through the restrictor 168 of the duct 167. This results in a pressure difference between the first and second pressure chambers 171 and 172, and thus the diaphragm 158 is displaced into the low pressure second pressure chamber 172 to reduce its volume. When this occurs, the permanent magnet 161 is moved away from the center of the reed switch 162 and the reed switch 162 is opened. However, with the passage of time the air is also introduced into the second pressure chamber 172 through the restrictor 168 of the duct 167 and the balanced condition is eventually restored, thus returning the diaphragm 158 to the initial position and closing the reed switch 162 again. When the driver releases the depression of the accelerator pedal, an operation which is the reverse of that described above tends to take place. In fact, however, the diaphragm 158 is moved no further, since the diaphragm 158 has already been drawn into the first pressure chamber 171 by the spring 152. In the experiments conducted, one pulse was generated each time there was a pressure change of over 50 mmHg/sec. By removing the spring 152, it is possible to make the reed switch 162 operable in response to the depression of the accelerator pedal as well as the releasing of the depression on the accelerator pedal. In this way, a positive pulse is generated at the output terminal 163.

Figure 7:
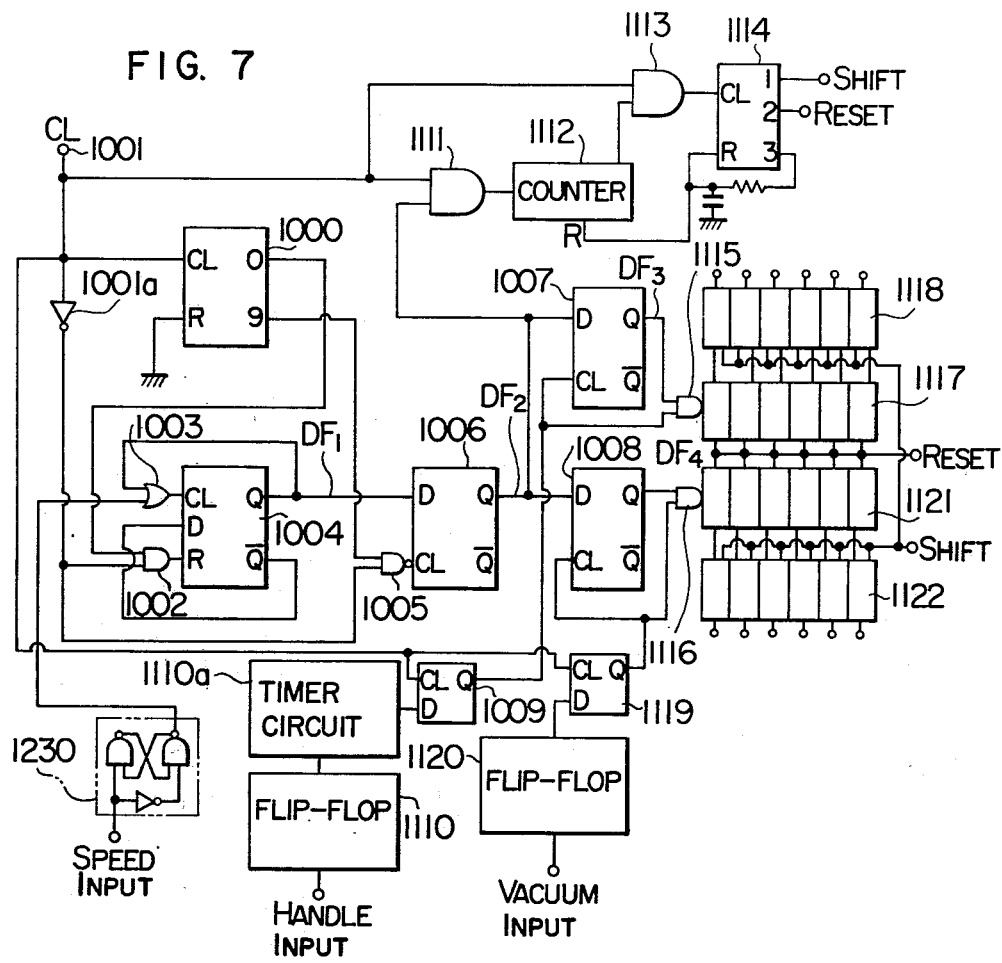
FIG. 7 is a wiring diagram of the signal collection circuit used in the embodiment of FIG. 1.
Figure 7A:
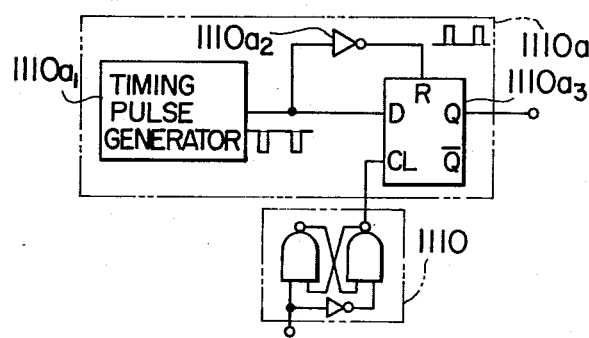
FIG. 7a is a wiring diagram of the timer circuit shown in FIG. 7.

In FIG. 7, there is illustrated one form of a collection circuit for supplying to a computing circuit the data obtained from the output signal of the above-described intake manifold pressure sensor and the steering sensor. In FIG. 7, numeral 1000 designates a decade counter, 1001 a clock pulse generator, 1001a a clock pulse inverter, 1002 a gate for removing the noise pulses generated due to the delay in operation of the elements in the electric circuitry in response to the application of the clock pulses (this situation is referred to as there exists a hazard) and it is operated in association with the inverter 1001a. Numeral 1003 designates an OR gate of a circuit for detecting whether the vehicle is at rest, 1004 a D-type flip-flop whose Q terminal goes to the "L" level (Q = O) when the vehicle is at rest, whereas the Q terminal goes to the "H" level (Q = 1) when the vehicle is in motion. Numeral 1005 designates a noise pulse cancelling NAND gate, 1006 a second stage D-type flip-flop, 1007 a D-type flip-flop for preventing the counting of the number of turning operations of the handle when the vehicle is at rest, 1008 a D-type flip-flop for the intake manifold pressure sensor 12 which operates in the same manner as the D-type flip-flop 1007, 1009 a D-type flip-flop for synchronizing the output signal pulses of the steering sensor 11 (i.e., from terminal 120 in FIG. 3 or 4); with the clock pulses, after the waveform of those steering output signal pulses have been reshaped by flip-flop 1110, which is similar in function and construction as a flip-flop 1230. Numeral 1110a designates a timer circuit for generating one output signal pulse when one or more pulses are generated from the flip-flop 1110 within a predetermined time limit. FIG. 7a illustrates in detail the contruction of the timer circuit 1110a and the flip-flop 1110. Numeral 1110$a_1$ designates a timing pulse generating circuit which may for example generate timing pulses having a time width so that its "H" level is 1 sec and its "L" level is 1 ms, 1110$a_2$ an invertor for inverting the timing pulses. Numeral 1110$a_3$ designates a D-type flip-flop for generating an output signal pulse which goes to the "H" level each time one or more pulses are received from the flip-flop 1110 during each "H" level time width of the timing pulses which is 1 sec. Numeral 1111 designates an AND gate for counting predetermined lengths of time while the vehicle is running, 1112 a counter, 1113 an AND gate for generating sequence pulses at the expiration of the predetermined time, 1114 a counter, 1115 a handle output pulse counting AND gate, 1116 an intake manifold pressure output pulse counting AND gate, 1117 a handle counter, 1118 a handle latch for storing the handle data or the count of the counter 1117, 1120 a waveform reshaping flip-flop which is similar in function and construction with the flip-flop 1230. Numeral 1119 designates a D-type flip-flop for synchronizing the output signal pulses of the intake manifold pressure sensor 12 (i.e., from FIG. 6 line 163 after reshaping by flip-flop 1120) with the clock pulses, 1121 an intake manifold pressure counter, 1122 an intake manifold pressure latch.

Figure 8:
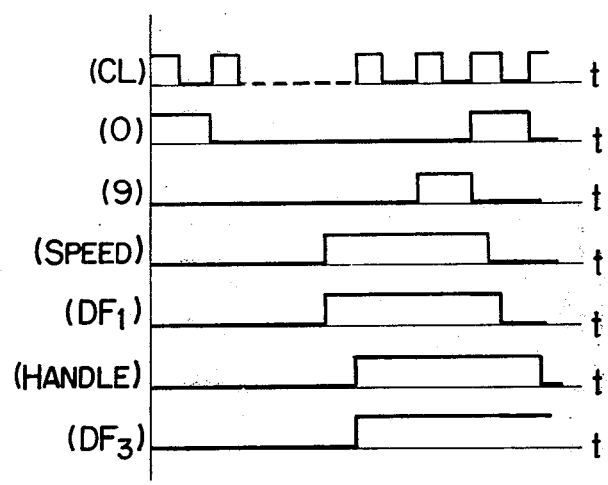
FIGS. 8 and 9 are waveform diagrams useful for explaining the operation of the signal collection circuit.
Figure 9:
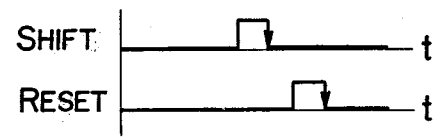

With the construction described above, the operation of the FIG. 7 collection circuit will now be described with reference to the waveform diagrams shown in FIGS. 8 and 9. Firstly, in order that the collection of data may be prevented when the vehicle is at rest, as for example, in order to prevent the data from differing considerably depending on whether the driver in a temporarily standing vehicle for a stop signal is holding the handle or releasing his hold of the handle, the generation of the various output signals is prevented while the vehicle is at a standstill. When the clock pulses shown in FIG. 8 (CL) are applied to the counter 1000, the counter 1000 repeats the operation of counting 10 pulses of the applied clock pulses. Then, as the output signal shown in FIG. 8(O) is generated at the "O" terminal of the counter 1000, the D-type flip-flop 1004 is reset and its D terminal goes to the "H" level. Thereafter, in response to the arrival through OR gate 1003 of the speed pulse of FIG. 8 (Speed) from flip-flop 1230 (as more fully explained below with regard to FIG. 10) indicating that the vehicle is in motion, the Q terminal of the D-type flip-flop 1004 goes to the "H" level as shown in FIG. 8 ($DF_1$). Consequently, the D terminal of the D-type flip-flop 1006 goes to the "H" level. Then, when 10 pulses of the clock pulses shown in FIG. 8 (CL) are applied to the counter 1000 so that the output signal shown in FIG. 8(9) is generated at its "9" terminal, the clock pulses are applied to the D-type flip-flop 1006 thus maintaining the Q terminal of the flip-flop 1006 at the "H" level. If, in this case, no speed pulse arrives by the time that 10 clock pulses arrive, the D terminal of the D-type flip-flop 1006 remains at the "L" level, so that when an output signal is generated at the "9" terminal, the Q terminal of the D-type flip-flop 1006 goes to the "L" level and thereafter the output pulses from the steering sensor 12 and the intake manifold pressure sensor 12 are blocked. On the other hand, when the vehicle is in motion, a number of pulses corresponding to the number of turns of the handle are applied to the D terminal of the D-type flip-flop 1009, the output pulse shown in FIG. 8 (Handle) is generated at the Q terminal of the D-type flip-flop 1009 in synchronism with the clock pulses. When one or more pulses corresponding to the speed are generated at this Q terminal as shown in FIG. 8 (Handle) during the time that 10 clock pulses are generated (e.g., when the vehicle is not at standstill), the Q terminal of the D-type flip-flop 1007 goes to the "H" level as shown in FIG. 8 ($DF_3$), and the said pulses are counted by the counter 1117 through the AND gate 1115.

The operation described above is true with the intake manifold pressure sensor 12. On the other hand, since the above-mentioned counting must be effected at predetermined intervals while the vehicle is in motion, this predetermined time interval is established by the counter 1112 and the AND gate 1111, and at the instant that the counter 1112 completes its counting a shift pulse and reset pulse of a preset sequence are generated by the AND gate 1113 and the counter 1114 as shown in FIGS. 9 (SHIFT) and 9 (RESET). In response to the shift and reset pulses, the counts of the counters 1117 and 1121 which respectively constitute the handle data and intake manifold pressure data are respectively stored in the associated latches 1118 and 1122.

In the operation described above, the time relationship among the clock pulses, the pulses corresponding to the speed and the manipulation of the handle and the operation of the D-type flip-flop 1007 may be summarized as shown in FIG. 8, and in this way the necessary data are collected in accordance with the output pulses of the steering sensor 11 and the intake manifold pressure sensor 12 only when the vehicle is in motion. Further, the shift and reset pulses shown in FIG. 9 indicate the timing of the shifting to the latches 1118 and 1122 and the reset timing of the counters 1117 and 1121. In this way, the handle data and the intake manifold pressure data are obtained and the corresponding outputs are supplied to the computing circuit.

In addition to the above-described data collection, the following data collection may be effected. Namely, a potentiometer operatively associated with the turning of the handle may be employed to detect the degree of angle that the handle is turned as the handle data.

Furthermore, the variation of the intake manifold pressure may for example be stored electrically so that pulses are generated in proportion to the stored value and the number of pulses generated in a unit time is counted to obtain the variation of the intake manifold pressure per unit time as the intake manifold pressure data. In this case, a capacitor may be employed as the storage means so that when the potential difference across the capacitor is positive, pulses are generated to supply a predetermined charge to discharge the electrical quantity of the capacitor, and the generation of pulses is stopped upon completion of the discharge, whereby the number of the pulses generated is counted to measure the variation of the intake manifold pressure per unit time.

Next, the collection of data relating to the running environmental condition of the vehicle will be described. In other words, the second group of sensors comprising the winker sensor 21, the wiper sensor 22 and the speed sensor 23 is employed. To begin with, the detailed construction of the winker sensor 21 and the wiper sensor 22 are not shown, since they may be comprised of switch means respectively operatively associated with the winker switch and the wiper switch.

Figure 10:
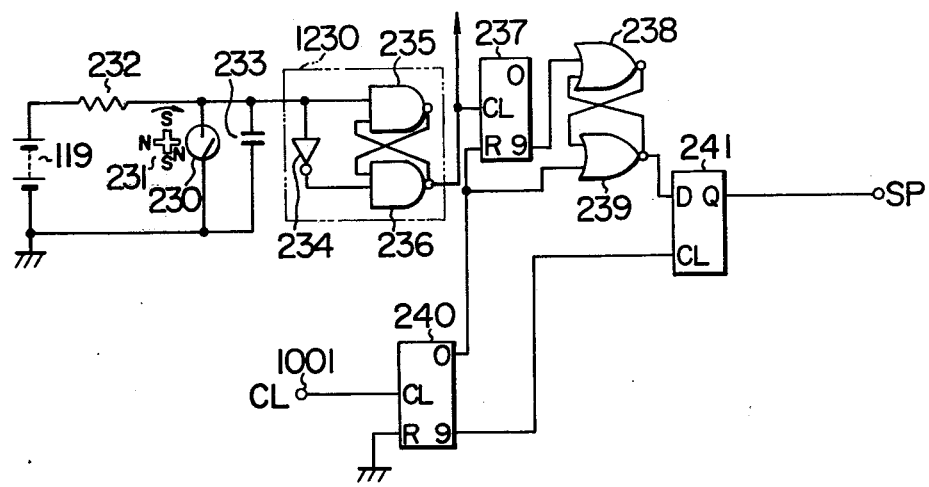
FIG. 10 is a wiring diagram of the speed discrimination circuit used in the embodiment of FIG. 1.

Next, FIG. 10 illustrates a speed discrimination circuit whereby whether the vehicle is running at a sufficiently high speed or is stagnant is discriminated in accordance with the running speed of the vehicle. In FIG. 10, numeral 230 designates a reed switch incorporated in the speedometer, 231 a permanent magnet rotated in synchronism with the speedometer cable, 233 an integrating capacitor for cancelling noise caused by the chattering, 234 an inverter, 235 and 236 NAND gates, 237 a decade counter for counting the number of on-off operations of the reed switch 230. Numerals 238 and 239 designate NOR gates, 240 a decade counter for counting the clock pulses generated from the clock pulse generator 1001, 241 a D-type flip-flop having its Q terminal adapted to go to the "L" level when the vehicle is at low speeds, while it goes to the "H" level when the vehicle is at high speeds. The signal generated at the Q terminal of the D-type flip-flop 241 constitutes a speed discrimination signal which is designated by a symbol SP.

With the construction described above, the speed discrimination circuit operates as follows. When the permanent magnet 231 rotates so that the reed switch 230 generates on/off signals, the counter 237 counts the signals. On the other hand, when the count of the counter 240 is reduced to "0" by the clock pulses CL, the counter 240 generates an output signal at its "0" terminal to reset the counter 237. And so far as the count of the counter 240 is between 1 and 9, the on/off signals from the reed switch 230 are counted by the counter 237. Consequently, when the "9" terminal of the counter 237 goes to the "H" level while the count of the counter 240 is between 1 and 9, the output of the NOR gate 238 goes to the "L" level. Since, in this case, the "0" terminal of the counter 240 is at the "L" level, the output of the NOR gate 239 goes to the "H" level causing the D terminal of the D-type flip-flop 241 to go to the "H" level. Thereafter, when the "9" terminal of the counter 240 next goes to the "H" level, the Q terminal of the D-type flip-flop 241 goes to the "H" level and the speed discrimination signal SP goes to the "H" level.

In the event that the running speed is low, prior to the "9" terminal of the counter 237 going to the "H" level, the reset signal from the counter 240 which causes the "0" terminal to go to the "H" level is applied to the R terminal of the counter 237, so that the D terminal of the D-type flip-flop 241 remains at the "L" level and thus the speed discrimination signal SP goes to the "L" level.

In accordance with the operations described above, the speed discrimination signal SP goes to the "H" level when the running speed is high, whereas it goes to the "L" level when the running speed is low. It is to be noted here that a flip-flop 1230 comprising the inverter 234 and the NAND gates 235 and 236 corresponds to the waveform reshaping flip-flop 1230 shown in FIG. 7 and the circuitry of FIG. 7 is in fact connected to the circuitry of FIG. 10, though the connections are not shown in FIG. 10.

The second sensor group 2 for detecting the running environmental conditions are constructed and arranged to function as mentioned above.

Next, the operational processing circuit will be described. A brief description of the data processing will be made first. If the input data, particularly those relating to the mental factors of the driver are designed so that whether the number of turns of the handle is greater or smaller than a predetermined value is fixedly discriminated, whether the number of movements of the accelerator pedal is greater or smaller than a predetermined fixed value is disciminted and so on, all of the data obtained differ depending on the types of vehicles, the types of environmental conditions which usually encounter vehicles, the characters of drivers, the driving habits of drivers and the driving manners of drivers. Therefore, it is necessary to obtain data as proper as possible.

For this reason, in the exemplary embodiment of this invention the input data are statistically processed. In other words, aiming at detecting the difference between the input data representing the variation pattern of the drivng conditions and the normal pattern so that if there is any difference therebetween, different signals are generated depending on the direction and degree of the deviation. At the same time, an assistant signal is additionally generated in consideration of the environmental conditions to indicate a definite method for assisting the driving operation, to call the attention of the driver to recover from the unfavorable mental condition or to provide a mental encouragement to the driver. Therefore, instead of unilateral supply of information such as giving the driver warning or caution which would cause a sense of oppression on the part of the driver, it is rather aimed at giving an assistance or encouragement which would not cause any sense of oppression on the part of the driver. For instance, if the variation pattern of the driving conditions is not deviating from the normal pattern, it is an indication that the driving conditions are excellent and thus an encouragement is given to the driver. In other words, the principal object consists in designing so that the operational processing and the resulting indication for generating information are accomplished in such a manner that the driver is prevented from being rather annoyed by the indication or entertaining antipathy against the indication thus falling in more unfavorable conditions, and helping the driver delight in driving. On the other hand, information is provided to assist the driver when the driver is in a dangerous driving situation.

In the exemplary embodiment, the processing mechanism comprises the following three elements:

a. The variation pattern of the current driving conditions is compared with the normal pattern based on the accumulation of the past data.

b. The past data are properly discarded for the purpose of dealing with the difference in surrounding environmental conditions and improvements in the driving techniques and discarding the superfluous data (with a view to eliminating any more complicated computations than actually needed and preventing the number of digits from being increased unnecessarily). For instance, while, in the illustrated embodiment, a digital filter is employed, in actual applications a shift register may be employed to discard any redundant data other than the proper number of data.

c. The processing of data is accomplished in a manner similar to that used with quality control in which any difference from the normal is for example detected in terms of the degree of deviation from the normal distribution, and it is determined whether the occurrence of such a difference is so rare that it can be considered to be so infrequent in the normal distribution.

Figure 11:
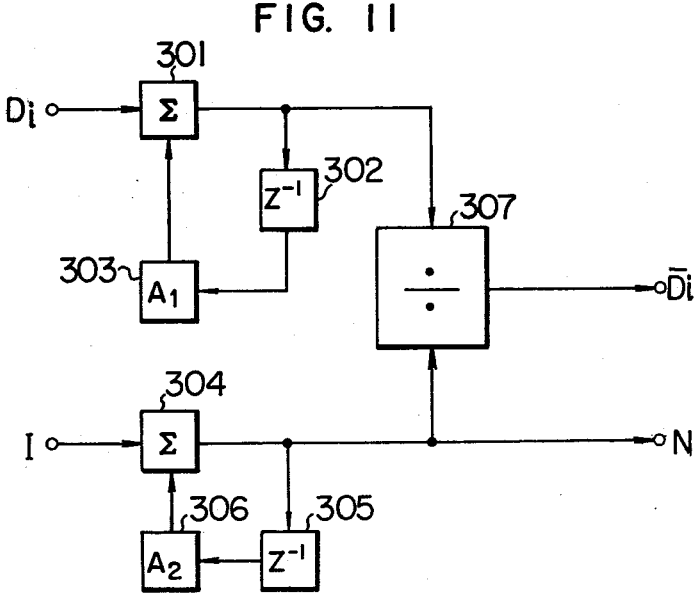
FIG. 11 is a detailed block diagram of the mean value circuit used in the embodiment of FIG. 1.

An exemplary form of the data processing arrangement will now be described. FIG. 11 illustrates the construction of a mean value circuit for providing the mean value in the data processing. In FIG. 11, symbol $D_i$ designates an input datum representing a variation pattern of the driving conditions corresponding for example to the stored value of the FIG. 7 latch 1118 which represents the handle datum or the stored value of the latch 1122 which represents the intake manifold pressure datum. Numeral 301 designates an adder indicated by a symbol $\Sigma$, 302 a memory for temporarily storing the latest result of addition whose value is indicated by a symbol $Z^{-1}$, 303 a multiplier for multiplying the stored value $Z^{-1}$ by a factor $A_1$, whose output value is added to the data $D_i$ in the adder 301. Numeral 304 designates an adder for obtaining the number of determinations of the data $D_i$, which adds a "1" signal on each determination of the datum $D_i$, 305 a memory for temporarily storing the latest output sum of the adder 304 in a like manner as the memory 302, 306 a multiplier for multiplying the stored value of the memory 305 by a factor $A_2$, 307 a divider, $\overline{D}_i$ the mean value of the determinations of data $D_i$, N the number of effective determinations.

With the construction described above, each time the datum $D_i$ is determined, it is added and temporarily stored in the memory 302. In this case, the stored value $Z^{-1}$ is multiplied by the factor $A_1$ and is added up successively. By selecting the value of the factor $A_1$ to be greater than 0 but smaller than 1, the past data may be diluted. Further, to compute the mean value $\overline{D}_i$, it is necessary to divide the current sum of the effective determinations by their number, and therefore the sum is divided by the sum total of the data "1's" multiplied by the factor $A_2$ (as produced at the output of the adder 304) to obtain the mean value $D_i$. Here, symbol N designates the number of the effective determinations. Further, by selecting the factors so that $A_1 = A_2$, the arithmetic mean may be obtained.

Figure 12:
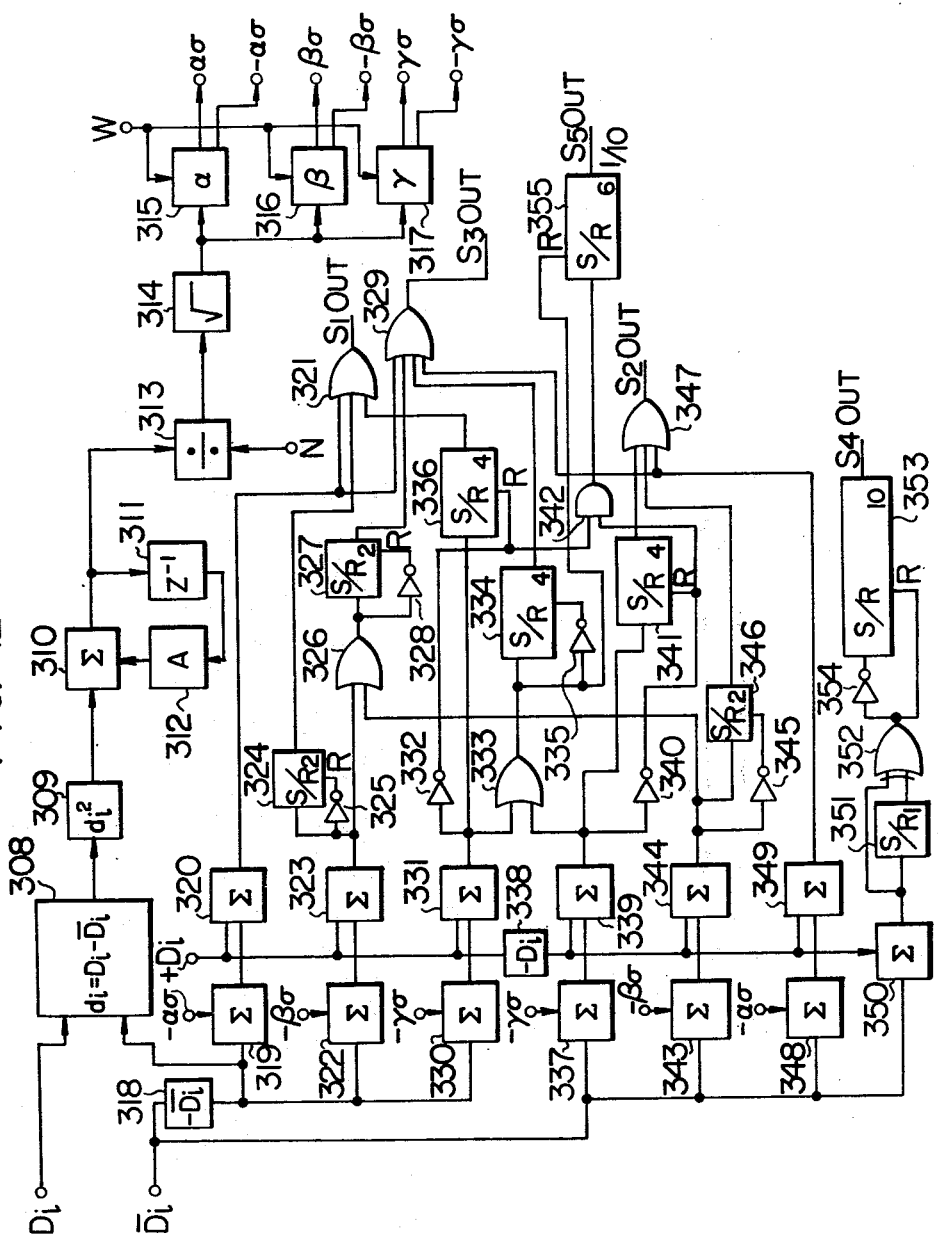
FIG. 12 is a detailed block diagram of the deviation computing circuit used in the embodiment of FIG. 1.

Referring now to FIG. 12, there is illustrated a deviation computing circuit for computing deviations. In FIG. 12, symbol $D_i$ designates an input datum, $\overline{D}_i$ a mean value of data, 308 an adder for producing the value of $d_i = D_i - \overline{D}_i$, 309 a square-law element for producing $d_i^2$, 310 an adder, 311 a memory for temporarily storing the current result of addition, 312 a multiplier for multiplying the stored value of the memory 311 by a factor A. A digital filter is provided by means of the combination of the adder 310, the memory 311 and the multiplier 312 with the factor being selected as $0 < A < 1$. Numeral 313 designates a divider for dividing the output signal of the digital filter or the result of addition by the number N of effective determinations, 314 a 1/2 multiplier for producing a square root of its input, 315 a multiplier for multiplying the input square root by a factor $\alpha$, 316 and 317 multipliers for multiplying their input by factors $\beta$ and $\gamma$, respectively, with the multipliers generating respectively output signals $\alpha\sigma$, $\beta\sigma$ and $\gamma\sigma$ in response to the input signal $\sigma$. The value of the factors $\alpha$, $\beta$ and $\gamma$ are modified in accordance with the output signal W of the wiper sensor 22. In other words, since the wiper switch is not closed except in rainy weather thus causing the output signal W to go to the "L" level, it is selected so that $\alpha = 3.00$. Consequently, the generation of any datum deviating from $3\sigma$ is considered to be an indication that something unusual has occured and thus the deviation in the driving conditions is computed and processed in accordance with the pertinent environmental conditions. On the other hand, since the rainy weather represents an environmental condition in which the possibility of accidents is about 1.4 times that in other weathers, the factor $\alpha$ is selected so that $\alpha = 2.88$ in place of $\alpha = 3.00$. Thus, when any datum deviating from $2.88\sigma$ is generated, it is considered to be an indication that something irregular has occured and the datum is computed and processed accordingly. In other words, the setting of the display in rainy weather is corrected by an amount by which the possibility of accidents in such rainy weather is higher than in other types of weather. Similarly, in accordance with the same probability, the factor $\beta$ for weathers other than the rainy weather is selected 1.94 and 1.86 for the rainy weather, while the factor $\gamma$ is selected 1.20 for weathers other than the rainy weather and 1.15 for the rainy weather. Numeral 318 designates a mean value inverting circuit for providing an inverted mean value $-\overline{D}_i$, 319 an adder for computing $(-\alpha\sigma - \overline{D}_i)$, 320 an adder for computing the sign of $(D_i - \overline{D}_i - \alpha\sigma)$ and generating an H level output signal when the sign is positive, 321 an OR gate for generating a first deviation signal $S_1$ when there occurs a deviation between the datum $D_i$ and the mean value $\overline{D}_i$ so that the former is greater than the latter by more than $\alpha\sigma$. Numeral 322 designates an adder for computing $(-\overline{D}_i - \beta\sigma)$, 323 an adder for computing the sign of $(D_i - \overline{D}_i - \beta\sigma)$ and generating an H level output signal when the sign is positive, 324 a circuit for generating an output signal which is $(D_i - \overline{D}_i - \beta\sigma) > 0$ for every two consecutive determinations of data and applying it to OR gate 321, 325 an inverter for resetting the circuit 324 when $(D_i - \overline{D}_i - \beta\sigma) < 0$, 326 an OR gate, 327 a circuit for generating an output signal when $(D_i - \overline{D}_i - \beta\sigma) > 0$ or $(-D_i + \overline{D}_i + \beta\sigma) < 0$, i.e., when the input datum deviates from $\beta\sigma$ for two consecutive determinations, 328 an inverter for resetting the circuit 327 when the said condition is not satisfied, 329 an OR gate for generating a third deviation signal $S_3$ when there is a large deviation, 330 an adder for computing $(-\overline{D}_i - \gamma\sigma)$, 331 an adder for computing the sign of $(D_i - \overline{D}_i - \gamma\sigma)$, 332 an inverter for resetting circuit 336 which provides an output to OR gate 321 when the output adder 331 is positive for four consecutive times, 337 an adder for computing $(\overline{D}_i - \gamma\sigma)$, 338 a datum inverter for inverting $D_i$ into $(-D_i)$. Numeral 339 designates an adder for computing the sign of $(\overline{D}_i - \gamma\sigma - D_i)$ and generating an "H" level output signal when the sign is positive, 333 an OR gate for producing the logical OR of the output signals of the adders 331 and 339, 334 a circuit for generating an output signal when the OR gate 333 generates four or more output signals consecutively, 335 an inverter for resetting the circuit 334, 340 an inverter, 341 a circuit for generating an output signal when there are four consecutive deviations smaller than $\gamma\sigma$, 342 and AND gate for detecting when the datum is within $= \gamma\sigma$ of the mean value, 355 a circuit for generating a fifth deviation signal upon detecting six consecutive determinations which are within $-\gamma\sigma$ of the mean value, 343 an adder for computing $\overline{D}_i - \beta\sigma)$, 344 an adder whereby $(\overline{D}_i - \beta\sigma - D_i)$ is computed and its sign is determined so that an "H" level output signal is generated when the sign is positive, 345 an inverter, 346 a circuit for generating an output signal when such a datum is generated twice consecutively, 347 an OR gate for generating a second deviation signal $S_2$ when the deviation of the input datum is such that it is considerably smaller than the mean value, 348 an adder for computing $(\overline{D}_i - \alpha\sigma)$, 349 an adder for computing the sign for $(\overline{D}_i - \alpha\sigma - D_i)$ and generating an "H" level output signal when the sign is positive, 350 an adder for computing $(\overline{D}_i - D_i)$ and generating an "H" level output signal when $(\overline{D}_i - D_i) > 0$, 351 a shift register, 352 an exclusive OR gate, 353 a circuit for generating a fourth deviation signal $S_4$ in response to the ten consecutive output signals of the exclusive OR gate 352, 354 an inverter.

With the deviation computing circuit constructed and operated as above described, the deviation of the input datum from the mean value is examined with a view to finding whether the deviation is so great that the deviation can be considered to be unusual. In other words, the first deviation signal $S_1$ is generated from the OR gate 321 when the input datum $(D_i - \overline{D}_i)$ is determined by adder 320 to be greater than $\alpha\sigma$, when the input datum is determined by circuit 324 to be greater than $\beta\sigma$ for two consecutive times or when the input data is determined by circuit 336 to be greater than $\gamma\sigma$ for four consecutive times, whereas OR gate 347 generates the second deviation signal $S_2$ when the input datum is small. On the other hand, the OR gate 329 generates the third deviation signal $S_3$ when the input datum though varying in value, is anyway deviating from $\alpha\sigma$, is deviating from $\beta\sigma$ for two consecutive times or is deviating from $\gamma\sigma$ for four consecutive times. Further, the circuit 353 generates the fourth deviation signal $S_4$ when there are ten consecutive determinations which are respectively greater than or smaller than the mean value. The fourth deviation signal $S_4$ is considered to be an indication that the running environment has changed. On the other hand, when the datum $D_i$ deviating from the value of the mean value $\overline{D}_i$ within the range $\pm \gamma\sigma$ remains so for six consecutive times, the circuit 355 generates the fifth deviation signal $S_5$. This probability is on the order of 1/10. In the above-described circuitry, each of the circuits designated by a symbol S/R is comprised of a shift register designed to shift its content by one each time the associated operation is completed. Two units of the circuitry shown in FIG. 12 are provided for processing the handle data and intake manifold pressure data.

Figure 13:
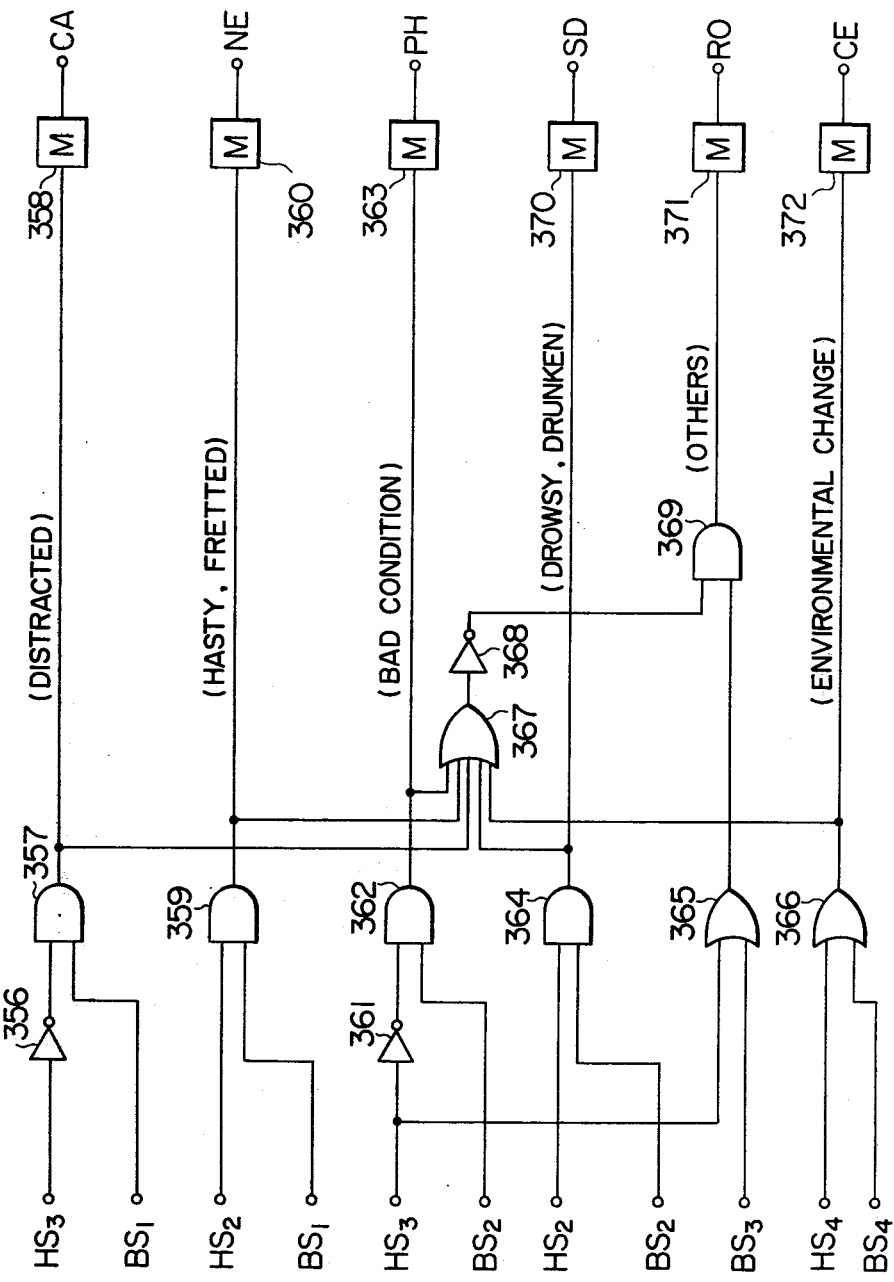
FIGS. 13 and 14 are detailed block diagrams showing a determination processing circuit used in the embodiment of FIG. 1.

Referring now to FIG. 13, there is illustrated a decision and processing circuit for the data processed in the circuitry of FIG. 12. In the circuitry of FIG. 13, symbols S with subscript and preceeded by a letter H indicate signals relating to the handle data obtained from a FIG. 12 type circuit, while on the other hand symbols S with subscript and preceeded by a letter B indicate signals relating to the intake manifold pressure data obtained from a separate FIG. 12 type circuit. Numeral 356 designates an inverter for inverting a signal $HS_3$, 357 an AND gate for receiving a signal $BS_1$ and a signal $\overline{HB}_s$ as its inputs, 358 a memory, 359 an AND gate for receiving a $HS_2$ signal and the $BS_1$ signal as its inputs, 360 a memory, 361 an inverter for inverting the signal $HS_3$, 362 an AND gate for receiving a $BS_2$ signal and the $\overline{HS}_3$ signal as its inputs, 363 a memory. Numeral 364 designates an AND gate for receiving the $HS_2$ signal and the $BS_2$ signal as its inputs, 370 a memory, 365 an OR gate for receiving the $HS_3$ signal and a $BS_3$ signal as its inputs, 366 an OR gate for receiving a $HS_4$ signal and a $BS_4$ signal as its inputs, 367 an OR gate for receiving the output signals of the AND gates 357, 359, 363 and 364 and the OR gate 366 as its inputs. Numeral 369 designates an AND gate for receiving the output signals of the OR gate 365 and the inverter 368 as its inputs, 371 a memory, 372 a memory.

The circuitry of FIG. 13 operates as follows. When the $HS_3$ signal is not applied but the $BS_1$ signal is applied, that is, when the number of turns of the handle is not particularly deviating from the normal number but the number of variations in the intake manifold pressure is high, it is decided that the driver has his attention attracted to anything other than the driving. Such a large number of variations in the intake manifold pressure indicates an excessive adjustment of the throttle opening, i.e., a situation where the driver is driving the vehicle by quickly and frequently depressing the accelerator pedal. More concretely, "the state of being attracted to other than driving" means a situation in which the driver is absorbed in the conversation with a fellow occupant, the driver is lost in thought or the driver is absorbed in listening to the radio. In such a case, the situation is temporarily stored in the memory 358 and thus a CA signal is generated. On the other hand, when the handle is turned infrequently but the number of fluctuations in the intake manifold pressure is high, it is decided that the driver is in haste and irritated. To be more concrete, this indicates the driving situation in which the driver is frantically trying to follow the proceeding vehicle, the driver is in haste so that he shall be in time or the driver is irritated. This outcome is temporarily stored in the memory 360 and an NE signal is generated.

When there is no marked change in the number of turns of the handle, but the number of fluctuations in the intake manifold pressure indicates that the accelerator pedal has been moved and retained at any given position, it is considered to be an indication that the driver is in a bad condition. The reason is that the driver will be constantly moving the handle back and forth to some extent dependeng on the road conditions. (Since the handle is moved by the road depending on its surface conditions, the driver manipulates the handle in response to the movements and therefore the number of manipulations of the handle indicates a considerably varying pattern if only the driver has a certain clear consciousness, whereas the number of manipulations of the handle decreases when the driver has an especially dim consciousness.) On the other hand, when the driver is in a bad condition but not so serious as to have a dim consciousness, the driver feels too lazy to operate the accelerator pedal. This signal is stored temporarily in the memory 363 and a PH signal is generated.

When the number of turns of the handle decreases and the number of fluctuations of the intake manifold pressure also decreases, that is, when it is considered that the driver has a dim consciousness, both the HS$_2$ signal and the BS$_2$ signal become true, and this condition is temporarily stored in the memory 370 as the state of being drowsy or drunken and an SD signal is generated.

Where both the HS$_4$ signal and the BS$_4$ signal become true, that is, when both the handle data and the intake manifold pressure data are always deviating in one or the other direction, it is temporarily stored in the memory 372 as an indication that some change has occured in the environmental conditions and a CE signal is generated. When both the HS$_3$ signal and the BS$_3$ signal are applied but none of the above-mentioned conditions is established, this situation is temporarily stored in the memory 371 as an indication that some other change has occured in the environmental conditions and an RO signal is generated. In FIG. 13, the like reference numerals designate the like signals.

Referring now to FIG. 14, there is illustrated a circuit for advising the driver that he is up to the mark in contrast to the circuitry of FIG. 13. In other words, when the datum on the number of turns of the handle and the datum on the number of fluctuations of the intake manifold pressure are both within $\pm\delta$ of the mean value and such data are generated for six consecutive times thus providing an HS$_5$ signal and a BS$_5$ signal, the probability of occurrence of which situation is considered to be on the order of 1/100, an AND gate 373 performs the AND operation and its output signal is temporarily stored in a memory 374 thus generating an EX signal. In order that this signal may give an encouragement to the driver, it is displayed by information generating means that will be described later.

Figure 15:
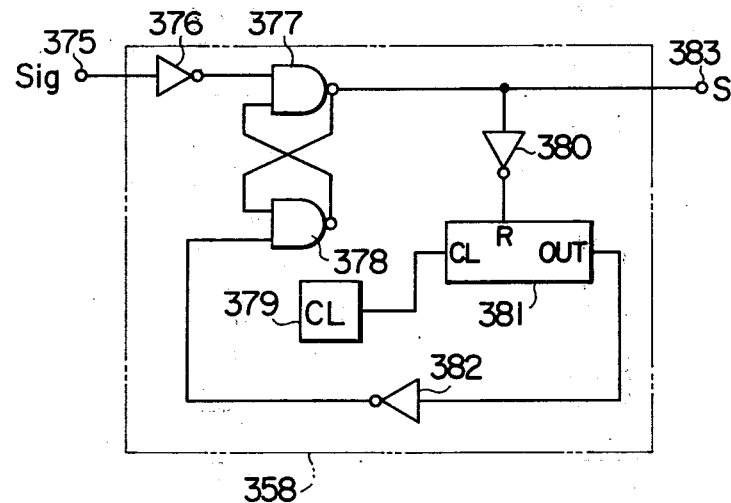
FIG. 15 is a detailed block diagram of the memory used in the circuit of FIGS. 13 and 14.

Referring now to FIG. 15, there is illustrated a detailed construction of the memory 358. The detailed construction of the memory 358 is similar with that of other memories 360, 363, 370, 371, 372 and 374 shown in FIGS. 13 and 14. In FIG. 15, numeral 375 designates the output signal of the AND gate 357, i.e, a Sig signal indicating the state of being attracted to anything other than driving. Numeral 376 designates an inverter, 377 and 378 NAND gates constituting an R-S flip-flop, 379 a clock pulse generator, 380 an inverter, 381 a time counter, 382 an inverter for resetting the R-S flip-flop, 383 an "S" signal corresponding to the CA signal. In operation, when the Sig signal is applied, the R-S flip-flop is set and the output of the NAND gate 377 goes to the "H" level. When this occurs, the reset state of the counter 381 is released through the inverter 380 and the counter 381 starts counting the clock pulses from the clock pulse generator 379. When a predetermined time has eventually elapsed, the output of the counter 381 goes to the "H" level and the R-S flip-flop is reset.

The computing and processing arrangement of the embodiment has been described so far.

Figure 16:
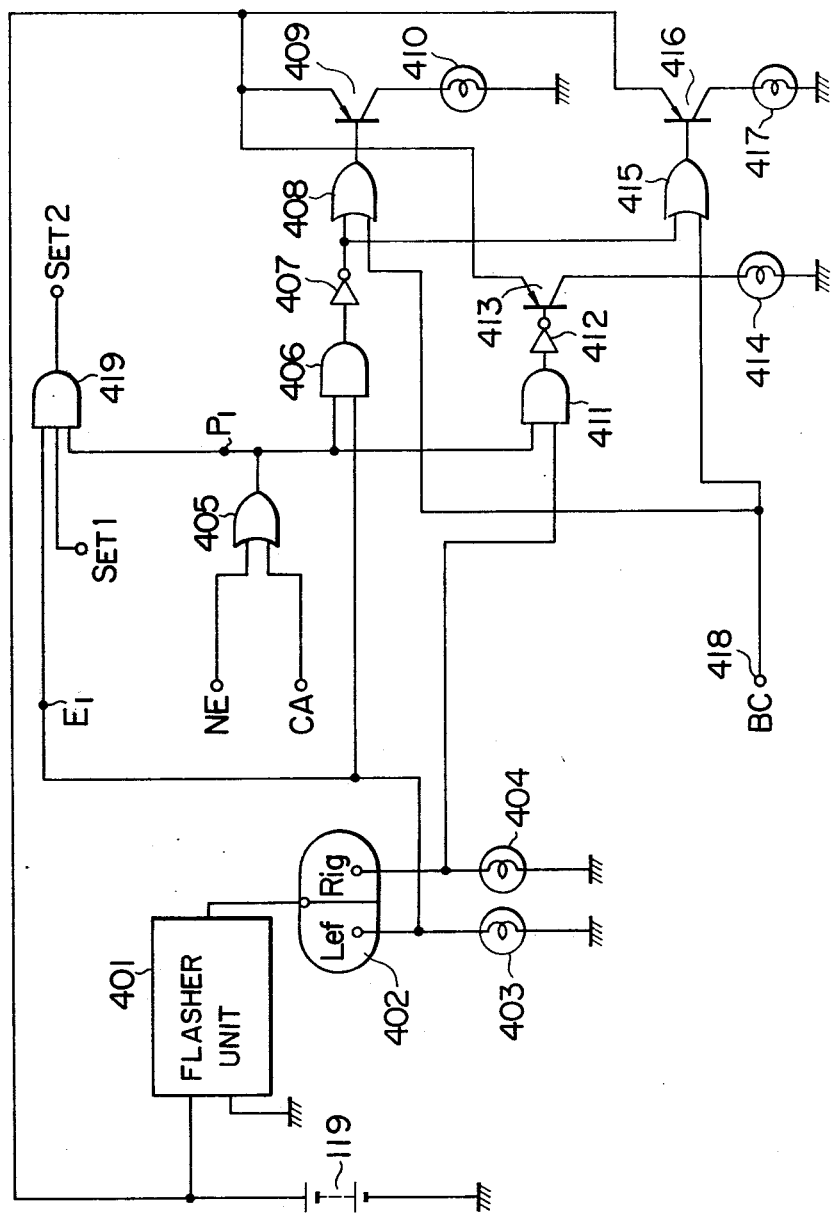
FIG. 16 is a wiring diagram of the processing and indicating circuit associated with a direction indicator.

Next, the display 4 will be described. Referring first to FIG. 16 illustrating the construction of the front flash lamp 41 and the back flash lamp 42, numeral 119 designates a vehicle battery, 401 a direction indicating flasher unit including a circuit for connecting the power supply with a flasher lamp 403 or 404 at predetermined intervals. Numeral 402 designates a direction indicator switch, 403 the direction indicating left lamp, 404 the direction indicating right lamp, 405 and OR gate for receiving the output CA signal of the memory 358 and the output NE signal of the memory 360 shown in FIG. 13, 406 an AND gate which operates in response to the application of the right turn signal by the flasher switch 402 and the output signal of the OR gate 405, 407 an inverter, 408 and OR gate which operates in response to the application of a BC signal that will be described later and the output of the inverter 407, 409 a transistor adapted to be rendered conductive by the application of the output of the OR gate 408, 410 a driving assistant lamp. Numeral 411 designates an AND gate responsive to the application of the output of the OR gate 405 and the right turn signal by the flasher switch 402, 412 an inverter, 413 a transistor adapted to be rendered conductive by the application of the output of the inverter 412, 414 a left driving assistant lamp. Numeral 418 designates the BC signal that will be described later, 415 an OR gate responsive to the application of the BC signal and the output of the inverter 407, 416 a transistor adapted to be rendered by the application of the output of the OR gate 415, 417 a rear driving assistant lamp, 419 an AND gate for receiving the output of the OR gate 405, a Set-1 signal that will be described later and the left turn signal (the output signal of the flasher switch 402) and adapted to apply its output signal or a Set-2 signal to a voice circuit that will be described later.

With the display 4 constructed as above described, when the left turn signal is generated, the left output line of the flasher switch 402 goes to the "H" level. If, at this time, the signal indicating that the driver is in haste or his attention is attracted to anything other than driving, that is, the NE signal or CA signal is being applied through the OR gate 405, all the inputs to the AND gate 406 are established and therefore the lamp 410 is turned on through the inverter 407, the OR gate 408 and the transistor 409. In this case, the signal is applied through the flasher unit 401 thus causing the lamp 410 to flash. The lamp 410 is also turned on in response to the application of the BC signal. In the like manner, the lamp 414 is turned on in response to the application of the right turn signal. On the other hand, the rear driving assistant lamp 417 is turned on when the left turn is directed in the presence of the NE signal, CA signal or BC signal.

The operations described above are designed in consideration of the fact that since there is a very great danger of causing an accident when unfavorable environmental conditions fall on as for example when the vehicle draws near an intersection, right or left turn lane or congested road while the driver is driving in a hasty manner or his attention is attracted to anything other than driving, it is necessary to advise the driver of such a place and give assistance to his driving movements. For example, to make the driver to look to the left ahead and the rear when turning to the left, the lamp on the left fender mirror and the rear viewing room mirror are turned on to warn the driver. Further, during a right turn, the lamp mounted on the right front fender mirror is turned on to cause the driver to look to the right front and the right rear. As regards the locations of these lamps 410, 414 and 417, they may be mounted on those portions which are easily noticed by the driver, such as, on the fender, the front dash board in the room, the rear body portion and so on. In view of the fact that a large number of accidents occured during left turns, a voice signal may be simultaneously generated to ensure an improved effect.

Figure 17:
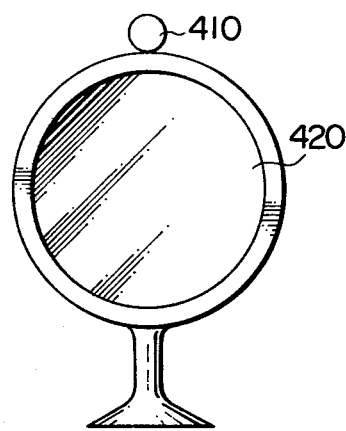
FIG. 17 is a front view of an indicating lamp mounted on a fender mirror.
Figure 18:
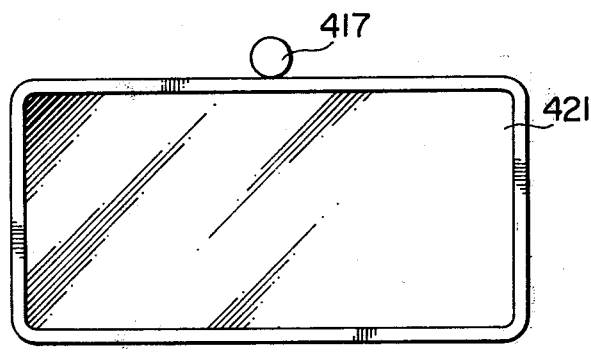
FIG. 18 is a front view of an indicating lamp mounted on a room mirror.

FIGS. 17 and 18 show the arrangement of the flash lamps mounted respectively on the fender mirror and the rear viewing room mirror. In FIG. 17, numeral 420 designates a left fender mirror. The manner in which the lamp is mounted on a right fender mirror is the same. In FIG. 18, numeral 421 designates the rear viewing room mirror mounted on the front part in the driver's compartment.

Figure 19:
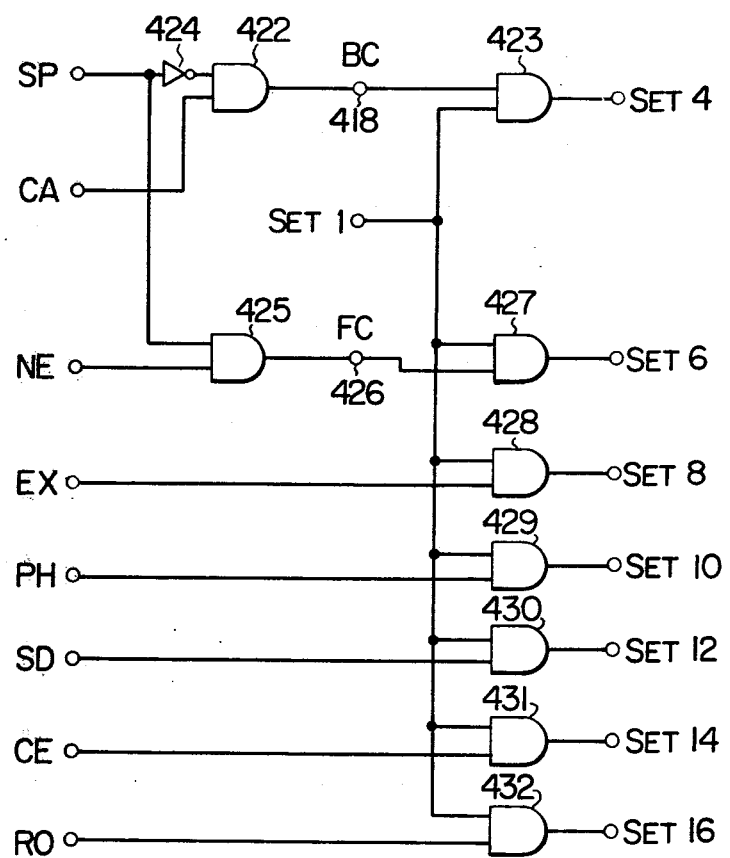
FIG. 19 is a detailed block diagram of the decision signal processing circuit used in the embodiment of FIG. 1.
Figure 20:
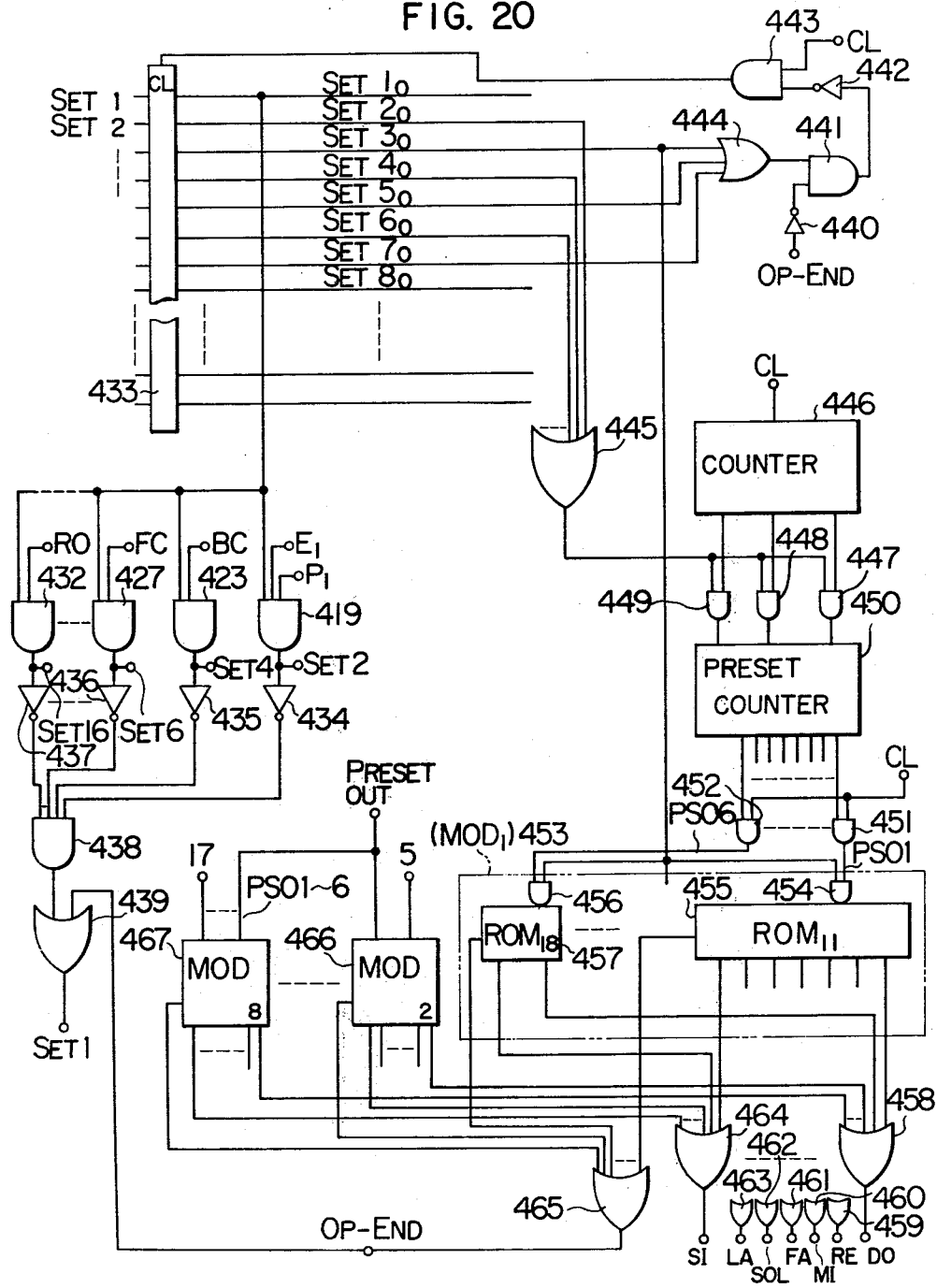
FIG. 20 is a detailed block diagram of the signal processing circuit for acoustic display used in the embodiment of FIG. 1.
Figure 21:
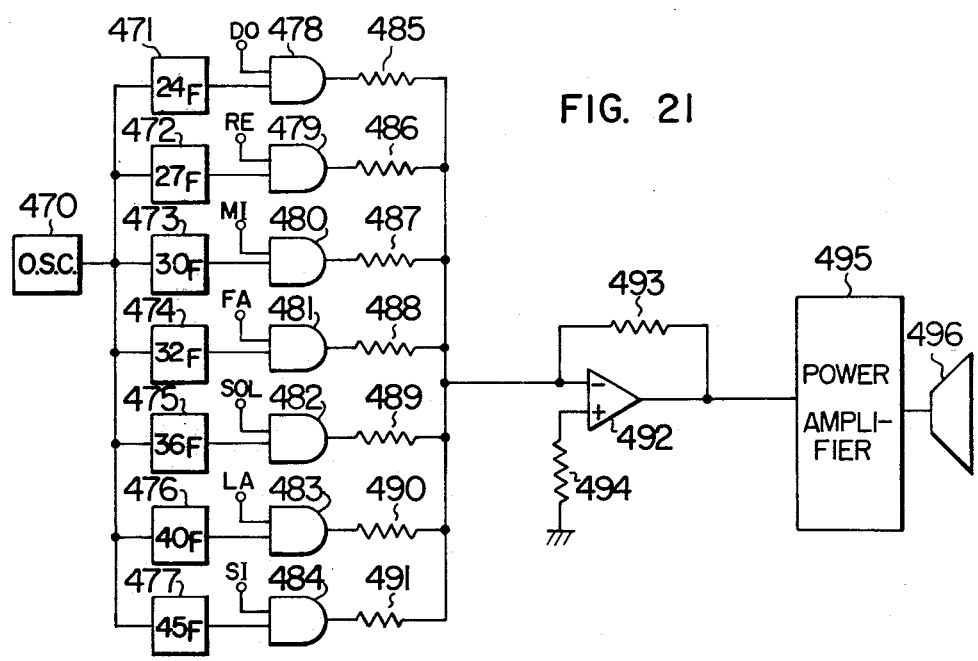
FIG. 21 is a detailed block diagram of the sound generating circuit used in the embodiment of FIG. 1.

Referring now to FIGS. 19, 20 and 21, there are illustrated those circuits which are connected to the sound generator 43.

In FIG. 19, numeral 422 designates an AND gate for receiving as its input the SP signal, i.e., the output of an inverter 424 which inverts the output level at the Q terminal of the D-type flip-flop 241 in FIG. 10 and the CA signal, 418 the output BC signal of the AND gate 424. Numeral 423 designates an AND gate for producing the logical product of the Set-1 signal that will be described later and the BC signal and generating an output or Set-4 signal, 425 an AND gate for producing the logical product of the SP signal and the NE signal in FIG. 13, 426 the output FC signal of the AND gate 425. Numeral 427 designates an AND gate for producing the logical product of the FC signal and the Set-1 signal and generating an output or Set-6 signal, 428, 429, 430, 431 and 432 AND gates for producing the logical product of the Set-1 signal and their associated EX signal, PH signal, SD signal, CE signal and RO signal, respectively and generating their respective outputs, i.e., Set-8, Set-10, Set-12, Set-14 and Set-16 signals.

With the construction described above, the BC signal is a signal whereby in order to prevent the vehicle from coming into rear-end collision with the proceeding or following vehicle when the attention of the driver is attracted to anything other than driving during a traffic jam, the left front fender mirror 420 and the room mirror or the rear viewing room mirror 421 are illuminated by the lamps to attract the attention of the driver. At the same time, the Set-4 signal gives an aural alarm to attract the attention of the driver. On the other hand, when the vehicle is running at a relatively high speed or the driver is in a fret, the FC signal is generated so that the Set-6 signal is generated to provided the driver with information that would calm down the driver to feel easy. In this case, since there is a great danger of causing a head-on collision, it is necessary to quickly bring the driver back into his normal mental state. The Set-8 signal associated with the EX signal is designed to provide an encouragement when the driver is in good condition, the Set-10 signal associated with the PH signal is designed to warn the driver of the situation caused by his being in a bad condition, the Set-12 signal associated with the SD signal is related to the drowsy or drunken state of the driver and therefore it is designed to direct the driver to stop the driving (by means of an aural alarm, by stopping the engine or by taking a measure so that the vehicle is allowed to move on at a very low speed), the Set-14 signal associated with the CE signal is designed to advise the driver that he is encountering the driving situation which he has never experienced, and the Set-16 signal associated with the RO signal is designed to advise the driver that something irregular has occured. In the arrangement of FIG. 19, the CA signal may be eliminated.

Next, while the required aural display may be provided by means of voice or sound, an acoustic display is employed in the illustrated embodiment. Namely, in FIG. 20 there is shown an exemplary construction of such an acoustic signal generator. In FIG. 20, symbol OP-END designates a signal for indicating the end of a single acoustic signal, 440 an inverter for the OP-END signal, 444 an OR gate for receiving the odd-numbered Set output signals, 441 an AND gate for receiving the outputs of the OR gate 444 and the inverter 440, 442 an inverter, 443 and AND gate for controlling the clock pulses CL in accordance with the output of the inverter 442, 433 a presettable counter for address allocation 419, 423, 427 and 432 AND gates respectively corresponding to the AND gates shown in FIG. 16 as well as in FIG. 19. The same applies to the AND gates 428, 429, 430 and 431 shown in FIG. 19 and their connections are not shown in FIG. 20 although they are interconnected in the actual circuit construction. Numerals 434, 435, 436 and 437 designate inverters, 438 an AND gate connected to the outputs of the inverters 434 through 437. When the output of the AND gate 438 becomes true, it is an indication that no one of the Set-2, Set-4, Set-6, . . . , Set-16 signals is true. Numeral 439 designates an OR gate for receiving as its inputs an OP-END signal indicative of the end of an acoustic cycle and the output of the AND gate 438 whereby when its output becomes true the input Set-1 signal to the presettable counter 433 goes to the "H" level to indicate the return to the Set-1 signal upon the next one clock pulse CL. Numeral 445 designates an OR gate for even-numbered addresses, 450 a preset counter, 446 a counter whose count always proceeds in synchronism wih the clock pulses CL, 447, 448 and 449 AND gates for setting the preset counter 450, 451 and 452 AND gates for indicatng the designated addresses (in this case one of the pertinent addresses 1 to 8 is selected), 454 an AND gate whereby the followng $ROM_{11}$ (read only memory) is set in response to the count of Set-$1_0$ for passing the clock pulses CL therethrough, 457 an $ROM_{18}$ memory for another address (the 8th address), 456 an AND gate. The $ROM_{11}$ through $ROM_{18}$ provide a set of driving assistant acoustic signals in response to a set of the SET-2 signals. For example, 8 different melodies are stored for the Set-2 signals and one of these melodies may be selected randomly. This group of melodies is represented by a mode $MOD_1$ associated with the Set-2 signals, and it is designated by a numeral 453. Similarly, a mode $MOD_2$ designated by numeral 466 is associated with the Set-4 signals, and a mode $MOD_8$ designated by numeral 467 is associated with the Set-16 signals. In the illustrated embodiment, each of these modes is provided with 8 different melodies. In each of the modes, the musical scale of the respective melodies is arranged by means of the associated OR gates 458 through 464 and the scale comprises do, re, mi, fa, sol, la and si. The rhythm of each melody is stored in the associated ROM and its tempo is determined in accordance with the frequency of the clock pulses CL. At the end of the melody, an input is applied to the OR gate 465 which in turn generates the OP-END signal.

With the arrangement described above, when no one of the Set signals is true (i.e., when no one of the Set-2, Set-4, . . . , Set-16 signals is true), the Set-1 signal is applied to supply the clock pulses CL to the presettable counter 433. In this case, however, the Set-1 signal or the output of the OR gate 439 is at the "H" level and therefore the count of the counter 433 does not proceed beyond a Set-$1_0$. When the Set-2 signal is applied to the counter 433, the count of the counter 433 is advanced to a Set-$2_0$ by the next clock pulses CL, and the output of the counter 446 is transferred to the present counter 450. If, at this time, it so happens that the first address is selected, the output of the AND gate 451 becomes true. In response to the following clock pulses CL, the count of the counter 433 proceeds to the Set-$3_0$. Since, at this time, the OP-END signal indicative of the end of a melody is not made true as yet, the AND gate 443 prevents the passage of the clock pulses CL to the counter 433. In this state, the AND operation of the AND gate 454 becomes true so that the selected melody is played in accordance with the rhythm stored in the ROM$_{11}$ and the tempo dependent on the clock pulses CL. When the melody eventually comes to an end, the ROM$_{11}$ memory 455 causes the output of the OR gate 465 to become true and the OP-END signal is generated. Consequently, the clock pulses CL are again applied to the presettable counter 433 and its count returns to the Set-$1_0$ since the OR operation of the OR gate 439 has been made true. This process may be similarly accomplished for each of the other Set signals to play any selected melody.

In FIG. 21, there is illustrated an exemplary form of a circuit for providing the above-mentioned musical scale. In FIG. 21, numeral 470 designates a sound generating oscillator whose oscillation frequency is suitably divided to provide the desired scale. Numeral 471 designates a frequency divider for dividing the oscillator frequency by a factor of 540 and generating a frequency which is a multiple of 24, e.g., a multiple of 24 and F (more concretely, it may be selected as F = 10), 472 a frequency divider for dividing the oscillator frequency by a factor of 480 to generate a frequency of 27F Hz, 473 a frequency divider for dividing the oscillator frequency by 432 to generate a frequency of 30F Hz, 474 a frequency divider for dividing the oscillator frequency by 405 to generate a frequency of 32F Hz, 475 a frequency divider for dividing the oscillator frequency by 360 to generate a frequency of 36F, 476 a frequency divider for dividing the oscillator frequency by 324 to generate a frequency of 40F Hz, 477 a frequency divider for dividing the oscillator frequency by 288 to generate a frequency of 45F Hz. These frequency dividers may for example be arranged so that the outputs of the frequency dividers 472 through 477 respectively correspond to the tones do, re, mi, fa, sol, la and si or the tones of frequency ratios proportional to the respective outputs. Numerals 478 through 484 designate AND gates for receiving respectively the associated do, re, mi, fa, sol, la and si signals from the previously mentioned control circuitry and passing the divider output frequencies therethrough, 485 through 491 voltage adding resistors, 492 a voltage amplifying operational amplifier, 493 a feedback resistor, 494 a balancing resistor, 495 a power amplifier, 496 a speaker for supplying a sound as an assistant signal to the driver. With the arrangement described so far, when the outputs of the OR gates 458 through 464 of FIG. 20 are applied to the device, one or a plurality of sounds, discrete sounds or the like are simultaneously directed to the driver through the operational amplifier 492, the power amplifier 495 and the speaker 496. The rhythm, melody and tempo of the sound are dictated by the associated one of the ROM memories in FIG. 20 (e.g., the ROM$_{11}$) and the corresponding sound is directed to the driver.

The circuits of the ROM memories of FIG. 20 and the sound generator of FIG. 21 may be arranged in a tape recorder with the necessary information recorded on a tape, so that the location of information is selected by a counter which indicates the tape position to thereby direct the proper voice or sound to the driver. Moreover, when such a tape is employed, the necessary comments and the corresponding codes may be recorded on the tape so that the outputs of the processing circuit such as the Set-2, Set-4, . . . , Set-16 may be selected in accordance with the codes.

While, in the embodiment of the invention described above, the normal pattern which provides the basis of assistant information for the driver is obtained in the form of the mean value of a plurality of past data items, the present invention is not intended to be limited to the mean value, and the center value or median of a plurality of data items or any other values provided that it is capable of providing the normal pattern corresponding to the driver.

The advantages of the embodiment described in detail hereinabove may be summarized as follows.

Firstly, the driver assisting system comprising a first group of sensors for determinating the mental stability of the driver, a second group of sensors for detecting the running environments of the vehicle, a circuit for processing the output information of the first and second sensor groups, and a circuit for displaying the necessary assistant information for driving in accordance with the results of the information processing, has the advantage of detecting any unfavorable environments or conditions encountering the driver and assisting the driver to operate the vehicle safely.

Secondly, since the processing circuit uses a statistical method to check whether the current data are particularly deviating from the normal driving so that when there is a deviation the situation in which the driver is placed is determined in accordance with the extent of the deviation, instead of determining the driving situation in accordance with the predetermined reference lines which roughly classify the driving manners, drivers characters, different driving areas and so on, the driving situation is determined in accordance with the deviation of the current data from the normal driving, thus making the system of this invention readily applicable to any drivers, any driving areas and any driving manners.

Thirdly, since the operational processing is accomplished on the environments encountering the driver in addition to the determination of the mental stability of the driver (e.g., when the intake manifold pressure data or the handle data continue to be deviating from the mean value in one direction, it is an indication that the driver is placed in somewhat unusual situation and in this sense the intake manifold pressure sensor and the handle sensor do not fall in the category of the first sensor group for purely determining the mental stability of the driver), it is possible to assist the driver in consideration of the situation in which the driver is really placed.

Fourthly, since the light display and acoustic display methods are employed to provide the required display, as for example the left turn is made, an assistant information is provided in the form of an advice which attracts the attention of the driver to the front and the rear, and it is provided at the proper place as mentioned earlier. Moreover, there is another great advantage that this effect is improved further by the effect of an aural assistance, the driver may be returned from his mentally unstable state to a stable state by an acoustic means, and the driver may be encouraged with a relative ease. As regards the sound such a when using a melody or melodies, in order to prevent the driver from becoming tired of a single melody, a number of melodies which are programmed and designed not to be played randomly may be employed to prevent the driver from losing his interest in the melodies. For the same purposes, the light may be modulated and changes in color may also be utilized. In this way, in the case of a vehicle operated by man, i.e., so-called man operated vehicle, the movements and characteristics of the mechanical parts may be linked to the characteristics of man thus allowing useful communication therebetween.

Fifthly, since the sensor group for determining the mental stability of the driver may utilize the data provided by at least either one of the handle sensor and the intake manifold pressure sensor, the necessary measurements can be accomplished without attaching any special instrument to the driver and thus the driver is not troubled in any way.

Sixthly, the data collection is effected at predetermined intervals, so that it is possible to collect the random activities of the driver in each time interval and determine the mental stability of the driver in accordance with the degree of the collected activities.

Seventhly, a first group of outputs indicative of conditions which are not suitable for driving the vehicle, a second group of outputs indicative of conditions which are highly suitable for driving the vehicle and a third group of outputs which pertain to none of the first two groups are generated in accordance with the determinations of the mental stability of the driver, whereby first information is provided in response to the first group of outputs to assist the driver in operating the vehicle and restore the mental stability, second information is provided in response to the second group of outputs to give encouragement to the driver, and no specific step is taken in response to the third group of outputs (the outputs represented by the absence of outputs) thus causing the driver no trouble other than needed.

Eightly, the processing circuit performs the computational operations on the basis of the latest data, and particularly the older data are not included in the basic data for determination, thus eliminating the effects of the gradually changing situation of the drivers (e.g., improvements in the driving techniques), the gradual changes in the driving environments and the gradual changes of the vehicles and preventing the occurrence of an overflow condition in the processing circuit. Further, by gradually removing the older data (by means of a digital filter method), the data continuous from the past up to data most pertinent to the latest data can be obtained.

What is claimed is:

1. A method for providing a driving person with helpful information for driving a vehicle comprising the steps of:
    detecting travelling conditions of a vehicle responding to a driving operation of said vehicle by a driver who is driving said vehicle;
    obtaining a variation pattern by calculating the rate of change per unit time of a detection signal generated in the preceding detecting step;
    computing a normal pattern always representing the latest average driving operation by said driver by sequentially accumulating data of said variation pattern at every predetermined unit of time, while sequentially cancelling the oldest data accumulated,
    further computing a deviation of said variation pattern from said normal pattern; and
    in accordance with the result of the computation in the preceding computing step, generating information giving said driver notice anticipated from the degree of the deviation.

2. A system for proving a driving person with helpful information for driving a vehicle comprising:
    sensing means for detecting travelling conditions of a vehicle responding to a driving operation of said vehicle by a driver who is driving said vehicle, to produce a detection signal;
    computing means connected to said sensing means for obtaining a variation pattern by calculating the rate of change per unit time of said detection signal, and for computing a normal pattern always representing the latest average driving operation by said driver by sequentially accumulating data of said variation pattern at every predetermined unit of time, while sequentially cancelling the oldest data accumulated,
    said computing means further computing a deviation of said variation pattern from a normal pattern to generate a command signal in accordance with the degree of the deviation; and
    information generating means connected to said computing means, responsive to said computing means for generating information giving said driver notice anticipated from the degree of the deviation.

3. A system for providing a driving person with helpful information for driving a vehicle comprising:
    a steering sensor for detecting movements of a steering wheel for adjusting the direction of movement of a vehicle;
    computing means connected to said steering sensor for obtaining a variation pattern of steering wheel operation by said driver by calculating the rate of change per unit time of r detection signal generated from said sensing means, and for computing a normal pattern always representing the latest average steering operation by said driver by sequentially accumulating data of said variation pattern at every predetermined unit of time, while sequentially cancelling the oldest data accumulated,
    said computing means further computing a deviation of said variation pattern from said normal pattern to generate a command signal in accordance with the degree of the deviation; and
    information generating means connected to said computing means responsive to said command signal for generating information giving said driver notice anticipated from the degree of the deviation.

4. A system for providing a driving person with helpful information for driving a vehicle comprising:
means for detecting the movements of an accelerator pedal in relation to the acceleration and deceleration of a vehicle;
computing means connected to said detecting means for obtaining a variation pattern of acceleration pedal operation by said driver by calculating the rate of change per unit time of a detection signal generated from said detecting means, and for computing a normal pattern always representing the latest average steering operation by said driver by sequentially accumulating data of said variation pattern at every predetermined unit of time, while sequentially cancelling the oldest data accumulated,
said computing means further computing a deviation of said variation pattern from said normal pattern to generate a command signal in accordance with the degree of the deviation; and
information generating means, responsive to said computing means, responsive to said command signal for generating information giving said driver notice anticipated from the degree of the deviation.

5. A system for providing a driving person with helpful information for driving a vehicle comprising:
sensing means for detecting travelling conditions of a vehicle responding to a driving operation of said vehicle by a driver who is driving said vehicle;
a collection circuit connected to said sensing means, for obtaining variation data by calculating the rate of change per unit time of a detection signal generated from said sensing means;
a mean value circuit connected to said collection circuit for computing a mean value always representing a latest average driving operation by said driver by sequentially accumulating, at every predetermined unit of time, said variation data generated by said collection circuit, while sequentially cancelling the oldest data accumulated;
a deviation computing circuit connected to said collection circuit and said mean value circuit, for computing a degree of deviation of said variation data from said mean value to generate a command signal in accordance with the degree of the deviation; and
information generating means connected to said deviation computing circuit, in response to said command signal for generating information giving said driver notice anticipated from the degree of the deviation.

6. A system according to claim 5, wherein there is provided stopping-of-vehicle detecting means for detecting the stopping of said vehicle to prevent said system from operating when said vehicle is stopping.

7. A system according to claim 6, wherein said stopping-of-vehicle detecting means include circuit means connected to said collection circuit, for preventing said collection circuit from operating by detecting the stopping of said vehicle.

8. A system according to claim 5, wherein said deviation computing circuit includes:

deviation discriminating means for generating a deviation discriminating signal when discriminating that the deviation of said variation data from said mean value exceeds a predetermined range; and
frequency discriminating means connected to said deviation discriminating means, for generating said command signal when the frequency of occurrences of said deviation discriminating signal coincides with one of predetermined values.

9. A system according to claim 8, wherein said frequency discriminating means include a plurality of circuits each thereof generating said command signal when the frequency of occurrences of said deviation discriminating signal coincides with each of said predetermined values.

10. A system according to claim 8, wherein there is provided a wiper sensor means connected to said deviation discriminating means, for detecting the closing of a wiper switch of said vehicle to narrow the predetermined range of said deviation discriminating means when wiper means of said vehicle is operating.

11. A system according to claim 5, wherein there is provided a speed sensor means connected to said information generating means, for detecting a travelling speed of said vehicle to change the condition of the occurrence of said information from said information generating means.

12. A system according to claim 5, wherein there is provided a winker sensor means connected to said information generating means, of detecting the closing of a winker switch of said vehicle, to change the condition of the occurrence of said information from said information generating means.

13. A method according to claim 1, wherein said normal pattern is obtained by storing and statistically performing computational operations on a large number of past data items constituting said variation pattern.

14. A method according to claim 1, wherein said normal pattern is obtained by computing the mean value of a large number of past data items constituting said variation pattern.

15. A system according to claim 2, wherein said sensing means include a steering sensor means for detecting the movements of a steering wheel for adjusting the direction of movement of the vehicle, and an intake manifold pressure sensor for detecting the variation of intake manifold pressure in relation to the acceleration and deceleration of the vehicle.

16. A system according to claim 2 further comprising environmental condition sensing means for detecting the surrounding environmental conditions of the vehicle to generate an output condition signal and controlling the generation of said command signal from said computing means in accordance with said output condition signal.

17. A system according to claim 4 wherein said means for detecting the movements of the accelerator pedal includes an intake manifold pressure sensor for detecting the pressure in the intake manifold of the internal combustion engine of the vehicle.

* * * * *